(12) United States Patent
Baldwin et al.

(10) Patent No.: US 9,623,645 B2
(45) Date of Patent: Apr. 18, 2017

(54) DISCONTINUOUS MANUFACTURING PROCESS

(71) Applicants: Brian Baldwin, Richmond, VA (US); John Cahill, Hudson, OH (US); Chris Shepherd, Issaquah, WA (US)

(72) Inventors: Brian Baldwin, Richmond, VA (US); John Cahill, Hudson, OH (US); Chris Shepherd, Issaquah, WA (US)

(73) Assignee: JUMPSTART CONSULTANTS, INC., Richmond, VA (US)

( * ) Notice: Subject to any disclaimer, the term of this patent is extended or adjusted under 35 U.S.C. 154(b) by 65 days.

(21) Appl. No.: 13/850,712

(22) Filed: Mar. 26, 2013

(65) Prior Publication Data

US 2014/0290035 A1   Oct. 2, 2014

(51) Int. Cl.
*B21B 45/02* (2006.01)
*B32B 38/00* (2006.01)
*B32B 41/00* (2006.01)

(52) U.S. Cl.
CPC .............. *B32B 38/00* (2013.01); *B32B 41/00* (2013.01); *B21B 45/02* (2013.01); *B65H 2301/41352* (2013.01); *B65H 2701/173* (2013.01); *Y10T 29/49982* (2015.01)

(58) Field of Classification Search
CPC .................. C08J 7/00; Y10T 29/49982; Y10T 428/24802; Y10T 428/24835; G03G 13/06; G03G 13/04; G03G 13/22; B21B 45/02
See application file for complete search history.

(56) References Cited

U.S. PATENT DOCUMENTS

| | | | | |
|---|---|---|---|---|
| 2,330,469 A | * | 9/1943 | Byus et al. ...................... 72/38 |
| 4,547,141 A | * | 10/1985 | Ruschmann .......... B44B 5/0019 |
| | | | | 264/1.31 |
| 5,316,837 A | * | 5/1994 | Cohen ..................... D04H 1/42 |
| | | | | 156/229 |
| 5,555,756 A | * | 9/1996 | Fischer et al. .................... 72/41 |
| 2008/0060405 A1 | * | 3/2008 | Ball et al. ....................... 72/234 |
| 2013/0086870 A1 | * | 4/2013 | Pong .............................. 53/399 |

* cited by examiner

*Primary Examiner* — Christopher Besler
(74) *Attorney, Agent, or Firm* — Flynn, Thiel, Boutell & Tanis, P.C.

(57) ABSTRACT

A discontinuous manufacturing process performs at least one processing step on a web of material unwound from a roll, applies an indicator code to the unwound web of material for indicating at least one finishing step the web of material is to be subjected to, rewinds the web of material having the indicator code on another roll and then transfers the rewound web of material to a remote finishing facility. At the remote finishing facility, the web of material is again unwound and transported towards a finishing station. The indicator code on the web of material is read at the finishing station and then directed to a location where an appropriate finishing step is performed on the web of material prior to it being rewound on a roll to form a product roll.

9 Claims, No Drawings

DISCONTINUOUS MANUFACTURING PROCESS

FIELD OF THE INVENTION

The field of the present invention relates to a discontinuous manufacturing process in which a roll of a web material is unwound, subjected to at least one processing step, a finishing indicator code placed on the web of material, the web of material rewound on a roll and then subjected to a finishing step based on the indicator code at a remote location.

BACKGROUND OF THE INVENTION

When webs of material are typically processed industrially, they are usually unwound from a roll and subjected to various processing and finishing operations and then rewound on a roll to be shipped out as a product. However, the overall speed and efficiency at which the web of material is processed is limited by the slowest processing step.

Discontinuous manufacturing processes for rolled goods are well known in the art. These discontinuous processes have the advantages of being able to isolate sub-processes at decoupled stations with dissimilar production speed limitations and enable each decoupled station to perform at its highest efficiency rates, without being subject to the limitations of the other related decoupled processing stations. However, these conventional discontinuous printing processes have an inherent limitation in their ability to facilitate the production of small, customized batch orders. In these situations, the higher processing speeds of secondary or finishing manufacturing processes do not facilitate the rapid differentiation and finishing sub-processes of small, customizable batch orders without operator inspection and manual processing changes.

It is an object of the present invention to provide a discontinuous manufacturing process in which a unique indicator code is placed on a web of material during a first processing stage. The indicator code provides data about a batch order which facilitates the efficient output of the secondary finishing process steps at rates higher than commonly achieved with a manual inspection process.

SUMMARY OF THE INVENTION

The object of the present invention is obtained by providing a discontinuous manufacturing process in which a web of material is unwound from a roll, subjected to a processing step, an indicator code provided thereon, the web of material rewound on another roll and transferred to a remote finishing station, the web of material is then unwound from the roll and transferred toward at least one finishing step, during the transfer of the web of material, the indicator code is read and the subsequent finishing step determined. Based on the determined finishing step, the web of material is transferred to the appropriate finishing station where it is subjected to a final finishing step before being rewound on a roll as a finished product.

DETAILED DESCRIPTION

The web of materials that can be used in the present invention include paper, fabrics, films, felts, scrims and other rolled materials and roll composites. The present invention is especially suitable for use in the processing of synthetic materials such as thermoplastic materials which are used as building wraps, synthetic roof underlayments, fence liners, tarps, industrial wraps, insulation and sheathing materials. Thermoplastic web materials are particularly preferred with polyolefins such as polypropylene and polyethylene being especially preferred. The rolled web width that can be used in the present invention is not limited and can range from approximately 34 inches to 124 inches.

Processing steps in which the web of material can be subjected to include, but are not limited to, corona treatment, plasma treatment, flame treatment, printing, perforation, topical adhesive applications, lamination, creping/wrinkling, stretching, and trimming. The finishing steps include, but are not limited to, a slitting step, an edge trimming step, a rewinding step and a labeling step. The indicator code applied to the web of material facilitates the efficient output of the finishing process steps at rates higher than commonly achieved with manual inspection processes and through the decoupling of the dissimilar manufacturing processes and automating of the batch order production in the finishing process, the decoupled stations are able to achieve their highest respective output. This enables an expanded ability to offer customized products, at lower minimum quantities and higher output levels to provide an economic advantage over conventional decoupled processes.

In the present invention, a web of material is unwound from a roll and fed to a first processing station, such as corona treatment equipment, plasma treatment equipment, flame treatment equipment or an aqueous primer applying equipment, to prepare the surface of the web to accept inks and other coatings. After being subjected to the surface treatment, the web of material can have printing applied thereon by a printer such as any well known digital printer used for printing on webs and utilizing an ink such as UV-, EB-, solvent or water-based ink, and digital ink-jet equipment.

After leaving the digital printer, the web material having the printed material thereon can be passed through a fuser or curer for the ink, such as a UV lamp or oven, to permanently affix the printing onto the web material. The web of material then can be sent to a printing station or other image-plate transfer system which uses flexographic, gravure or any other type of in-line printer. Water-based inks, solvent-based inks, UV-curable inks and EB-curable inks can be used at the flexographic printing station. After receiving the printing thereon, the web then can be sent to a station for the curing or drying of the applied ink depending on the type of ink applied.

In addition to or alternative to the printing steps described above, the web of material can be sent to a perforation station where the surface thereof is perforated, a topical adhesive application station where a topical adhesive is applied thereto, a station where another material is laminated to the surface of the web of material, a creping/wrinkling station, a stretching station where the web of material can be stretched in either or both of the machine and cross-directions, and a trimming station where the web of material is trimmed.

After these processing steps, an indicator code, such as a bar code printed thereon which can be read by an optical reader or an electronic transmitter affixed thereto for transmitting electronic data. The indicator code signals data about the finishing steps to be applied to a batch order of the web of material at a decoupled finishing station. After the web of material has the indicator code applied thereto, it is rewound on another roll and then transferred to a remote location where finishing processes are performed.

At the remote location, the web of material is unwound from the roll and the indicator code read by a reading apparatus, such as a bar code reader or a device which receives a signal from the indicator, to determine the finishing step(s) to be performed on the web of material. The web of material is then transferred to a proper decoupled finishing station where finishing steps, such as slitting, seaming, trimming and/or applying a label thereto, are performed. The web of material is then rewound on a roll as a finished product.

What is claimed is:

1. A discontinuous manufacturing process comprising the steps of:
   providing a first roll of a web material;
   unwinding the web material from the roll;
   subjecting the unwound web material to at least one processing step comprising a step of printing by a combination of a flexographic printer and a digital printer;
   applying an indicator code to the unwound web material for indicating at least one finishing step the web material is to be subjected to;
   rewinding the web material having the indicator code onto a second roll;
   transferring the rewound web material to a secondary manufacturing process;
   unwinding the rewound web material and transporting it towards a finishing station;
   reading the indicator code on the web material prior to it reaching the finishing station;
   performing a finishing step on the web material based on the indicator code to form a finished web material; and
   rewinding the finished web material onto a third roll.

2. The process of claim 1, wherein said at least one processing step additionally comprises at least one step selected from the group consisting of a corona treatment step, a plasma treatment step, a flame treatment step, a perforation step, a topical adhesive application step, a lamination step, a creping/wrinkling step, a stretching step and a trimming step.

3. The process of claim 1, wherein said at least one finishing step is at least one step selected from the group consisting of a slitting step, an edge trimming step and a labeling step.

4. The process of claim 1, wherein said indicator code is a bar code and the bar code is read by a bar code reader prior to the web of material reaching the finishing station.

5. The method of claim 1, wherein the at least one processing step additionally comprises a step of subjecting a surface of the web of material to a corona discharge.

6. The method of claim 1, wherein the at least one processing step additionally comprises a step of perforating the web of material.

7. The method of claim 1, wherein the at least one processing step additionally comprises a step of stretching the web of material.

8. The method of claim 1, wherein the at least one finishing step comprises a step of applying a label to the rewound finished web of material.

9. The method of claim 8, additionally comprising the step of printing on the label prior to it being applied.

* * * * *